W. W. PATTERSON.
LIGHTNING-RODS.

No. 193,991. Patented Aug. 7, 1877.

Witnesses.
A. Ruppert,
Jno. G. Mason

W. W. Patterson
Inventor.
D. P. Holloway & Co.
Attys.

UNITED STATES PATENT OFFICE.

WILLIAM W. PATTERSON, OF CORNING, IOWA.

IMPROVEMENT IN LIGHTNING-RODS.

Specification forming part of Letters Patent No. 193,991, dated August 7, 1877; application filed April 30, 1877.

*To all whom it may concern:*

Be it known that I, WILLIAM W. PATTERSON, of Corning, in the county of Adams and State of Iowa, have invented a new and useful Improvement in Lightning-Rod Tips, of which the following is a specification:

This invention has for its object the production of a lightning-rod tip, which consists of intersecting circles studded with points at various angles, and a small globe or ball suspended within this circle.

Figure 1:
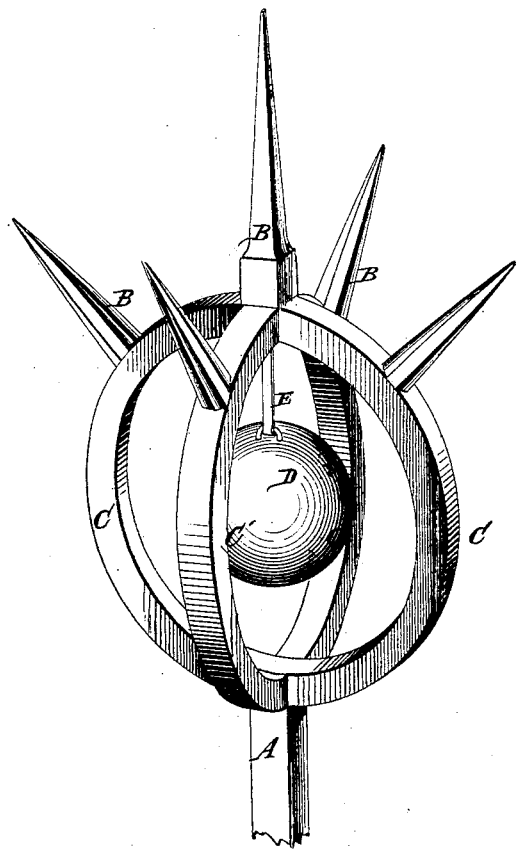
Figure 2:
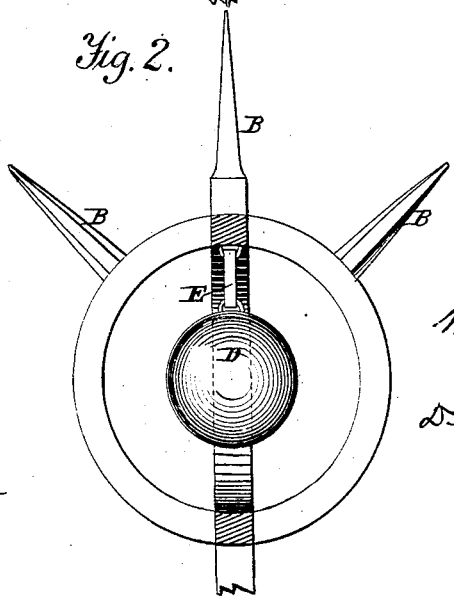

In the annexed drawings, making a part of this specification, Figure 1 is a perspective view of the tip. Fig. 2 is a vertical section.

The same letters are employed in both figures in the indication of identical parts.

The tip consists of two circles, C and C', of silver and copper plates, placed so that their horizontal diameters shall be at right angles, both circles being studded with metallic points B B, made of the same metals as the circles. Immediately beneath the main point a magnetic ball or globe, D, is suspended by a strip of zinc, E, so that the ball will hang within the intersecting circles. A is the stem by which the tip is attached to the lightning-rod.

What I claim as my invention, and desire to secure by Letters Patent, is—

A lightning-rod tip formed by the union of two intersecting circles of metal, and having a series of points projecting therefrom at various angles, and a magnetized ball or globe suspended within the intersecting circles, substantially as set forth.

In testimony whereof I have signed my name to this specification in the presence of two subscribing witnesses.

WILLIAM W. PATTERSON.

Witnesses:
 ASBURY COLLINS,
 A. W. CRIPPEN.